United States Patent
Klein (10) Patent No.: US 11,268,878 B2
(45) Date of Patent: Mar. 8, 2022

(54) METHOD FOR TESTING A FIBER COMPOSITE COMPONENT, DEVICE, COMPUTER PROGRAM AND MACHINE-READABLE STORAGE MEDIUM

(71) Applicant: Robert Bosch GmbH, Stuttgart (DE)

(72) Inventor: Linda Klein, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/674,093

(22) Filed: Nov. 5, 2019

(65) Prior Publication Data

US 2020/0182740 A1 Jun. 11, 2020

(30) Foreign Application Priority Data

Dec. 5, 2018 (DE) ...................... 10 2018 221 016.0

(51) Int. Cl.
- G01M 7/00 (2006.01)
- B29C 70/54 (2006.01)
- G01M 7/08 (2006.01)

(52) U.S. Cl.
CPC ............... G01M 7/00 (2013.01); B29C 70/54 (2013.01); G01M 7/08 (2013.01)

(58) Field of Classification Search
CPC .......... G01M 7/00; G01M 7/08; G01M 5/005; G01M 5/0066; G01M 5/0033; G01H 11/08; G01N 29/12; G01N 29/045
See application file for complete search history.

(56) References Cited

U.S. PATENT DOCUMENTS

| | | | | |
|---|---|---|---|---|
| 4,838,085 A | * | 6/1989 | Pellerin | G01N 29/045 73/597 |
| 5,242,512 A | * | 9/1993 | Bagley | G01N 29/12 148/558 |
| 5,533,399 A | * | 7/1996 | Gibson | G01H 5/00 73/579 |
| 6,370,964 B1 | * | 4/2002 | Chang | G01B 5/30 73/862.046 |
| 6,799,126 B1 | * | 9/2004 | Ratcliffe | G01N 29/14 702/35 |
| 7,176,448 B2 | * | 2/2007 | Ogisu | G01M 11/086 250/227.14 |
| 7,373,260 B2 | * | 5/2008 | Kessler | G01B 5/30 702/35 |

(Continued)

FOREIGN PATENT DOCUMENTS

DE 10 2016 220 032 A1 4/2018
WO 2018/069066 A1 4/2018

*Primary Examiner* — Helen C Kwok (74) *Attorney, Agent, or Firm* — Maginot, Moore & Beck LLP (57) ABSTRACT

Method for testing a fiber composite component, in particular a body component for a vehicle, wherein the fiber composite component comprises a sensor device which is integrated in the fiber composite component, wherein the sensor device comprises a flexible circuit carrier having a sensor module, in particular having a micromechanical sensor module, for ascertaining an acceleration value, said method comprising the steps: setting the fiber composite component into a test vibration, in particular by applying a test pulse to a test site of the fiber composite component; capturing a response signal using the sensor device; and comparing the response signal with a reference signal.

2 Claims, 6 Drawing Sheets

(56) References Cited

U.S. PATENT DOCUMENTS

| | | | | |
|---|---|---|---|---|
| 7,822,258 B2* | 10/2010 | Senibi | ............... | G01N 29/041 382/141 |
| 8,096,223 B1* | 1/2012 | Andrews | ............... | F41H 5/0492 89/36.02 |
| 8,656,779 B2* | 2/2014 | Adams | ............... | G01M 5/0033 73/582 |
| 2008/0179993 A1* | 7/2008 | Sanderson | ............... | G01M 5/0041 310/319 |
| 2009/0259411 A1* | 10/2009 | Loomis | ............... | G01B 7/16 702/35 |
| 2011/0222225 A1* | 9/2011 | Kessler | ............... | G08C 19/16 361/679.02 |
| 2012/0318925 A1* | 12/2012 | Gibson | ............... | G01N 27/20 244/158.3 |
| 2013/0298690 A1* | 11/2013 | Bond | ............... | G01M 7/08 73/788 |
| 2016/0202113 A1* | 7/2016 | Petricevic | ............... | G01H 1/00 73/584 |
| 2017/0168021 A1* | 6/2017 | Van Tooren | ............... | G01N 29/041 |
| 2018/0209943 A1* | 7/2018 | Safai | ............... | G01N 29/11 |
| 2019/0257793 A1* | 8/2019 | Yazzie | ............... | G01N 29/4445 |
| 2019/0353554 A1* | 11/2019 | Mahavadi | ............... | G01N 29/11 |
| 2019/0360891 A1* | 11/2019 | Linde | ............... | B64F 5/60 |
| 2021/0010940 A1* | 1/2021 | Klein | ............... | B29C 70/443 |

\* cited by examiner

METHOD FOR TESTING A FIBER COMPOSITE COMPONENT, DEVICE, COMPUTER PROGRAM AND MACHINE-READABLE STORAGE MEDIUM

This application claims priority under 35 U.S.C. § 119 to application no. DE 10 2018 221 016.0, filed on Dec. 5, 2018 in Germany, the disclosure of which is incorporated herein by reference in its entirety.

TECHNICAL FIELD

The present disclosure relates to a method for testing a fiber composite component, a corresponding device, a corresponding computer program and a corresponding machine-readable storage medium.

BACKGROUND

WO 2018/069066 A1 discloses a method for arranging a number of micromechanical acceleration sensors on or in a synthetic material component, in particular a bumper, and a corresponding synthetic material component, in particular a bumper.

In step A of the method, the micromechanical acceleration sensor is fixedly positioned in or on a flexible circuit carrier, wherein the micromechanical acceleration sensor is contacted by an integrated conductor track structure of the flexible circuit carrier.

In step B of the method, the micromechanical acceleration sensor and the flexible circuit carrier are arranged at least in regions on or in the synthetic material component in such a manner that the integrated conductor track structure of the flexible circuit carrier is exposed at least in part.

DE 10 2016 220 032 A1 discloses a sensor device for a vehicle, in particular a motor vehicle, having at least one sensor module and having at least one connection line which is connected to the sensor module so as to electrically contact the sensor module.

It is provided that the connection line is configured as a conductor foil on which multiple different sensor modules are arranged, and said sensor modules are encased respectively by means of one injection molding or a common injection molding which covers the conductor foil at least in sections.

SUMMARY

The present disclosure provides a method for testing a fiber composite component, a corresponding device, a corresponding computer program and a corresponding machine-readable storage medium.

Preferred further developments are disclosed in the embodiments and the following description of the advantages of the disclosure.

One aspect of the present disclosure is a method for testing a fiber composite component, wherein the fiber composite component comprises a sensor device which is integrated in the fiber composite component, wherein the sensor device comprises a flexible circuit carrier having a sensor module, said method comprising the steps:
  Set the fiber composite component into a test vibration, in particular by applying a test pulse to a test site of the fiber composite component;
  Capture a response signal using the sensor device;
  Compare the response signal with a reference signal;

In the present case, the term "a fiber composite component" may be understood to be a component which comprises a fiber composite material. A fiber composite material is generally produced by means of an alternating composite structure of fibers or a semi-finished textile product and a matrix between the fibers or rather the semi-finished textile product. The matrix is a filler material and adhesive material for the fibers or rather the semi-finished textile product. It is typical for fiber composite materials that the alternating effect of the composite structure produces a material which comprises higher grade characteristics in comparison with the characteristics of the fibers and the filler material.

The fiber composite component may be a body component for a vehicle. By way of example, the fiber composite component may be a bumper for a vehicle.

The fiber composite component in accordance with the present disclosure may be produced using a casting method. It is possible in particular during the step of integration to use for this purpose a so-called liquid composite molding method (LCM method). LCM methods are characterized by virtue of the fact that comparatively moderate pressure and temperature loads are involved.

A flexible circuit carrier may comprise silicone, polyurethane, polyamide or thermoplastics. Consequently, the flexible circuit carrier is able to deform easily in an elastic or plastic manner, in particular the integrated conductor track structure is able to deform accordingly in a plastic manner, as a result of which it is fundamentally possible to adapt the flexible circuit carrier to suit a geometric shape or form of the fiber composite component. The flexible circuit carrier may be a conductor foil.

The term "a sensor module" may be understood to mean an electronic or electrical component for ascertaining a physical size or a physical value. A sensor module may be configured so as to ascertain an acceleration value or a rotational acceleration value.

It would be conceivable to configure the sensor module so as to ascertain a pressure. Such an embodiment does however require an open interface of the sensor module to the environment of the fiber composite component.

The sensor module may be a micromechanical component for ascertaining an acceleration value, thus a micromechanical acceleration sensor according to the type of microelectromechanical systems (MEMS).

The method in accordance with the present disclosure forms an expanded safety function of a fiber composite component having a sensor device which is integrated in the fiber composite component. This safety function is available above all for fiber composite components such as body components of a vehicle. Sensor values provided by the sensor device, especially acceleration values provided by a corresponding sensor device for ascertaining acceleration values, may be used in this case not only for realizing a protection function for traffic participants such as the occupants of the vehicle or other traffic participants but rather they may also be used as an expanded safety function for testing the fiber composite component.

This expanded safety function is realized based on the background that mechanical energy contributions on the fiber composite components may cause internal damage in the component. This damage may be delaminations, fiber breakage, torn fibers, or so-called fiber pull-outs. This damage may have disadvantageous effects on the characteristics of the component. If a fiber composite component is used as a body component, it is possible in numerous ways for mechanical energy contributions to influence the component, by way of example as a result of so-called "door dings," parking dents, and other trivial damage while parked or other collisions. The internal damage which occurs may change the character of the component in general. This may influence the vibration behavior of the component. In other words, pulses which are applied are returned in a different manner in the case of a damaged component than in the case of components in their original state. This different manner, in other words this difference, may be ascertained by means of the method of the present disclosure and thus provides direct feedback with regard to the condition, the state, and/or the general character of the component.

Since the signal which is provided by the sensor module which is integrated in the fiber composite component reacts directly to the changed character of the component, said signal is used for ascertaining or detecting the values.

In accordance with one embodiment of the method of the present disclosure, the reference signal is generated by virtue of the fact that the fiber composite component is set into a reference vibration and the reference vibration is ascertained using the sensor device and the captured signal or a signal which is derived therefrom is the reference signal.

The reference signal is used for subsequent examinations or tests on the fiber composite component.

It is of advantage if the reference signal is generated in the new state of the fiber composite component. It is consequently possible during a subsequent test on the fiber composite component in accordance with the method of the present disclosure to ascertain a change in the character by means of comparing the response signal with the reference signal. Based on the ascertained characteristic of the component, it is possible to conclude the state or condition of the component at the point in time in which the method is performed for testing the fiber composite component in comparison with the new state or the new condition of said fiber composite component. A suitable measure may be implemented using this information.

In the case of body components for a vehicle, a suitable measure may be the recommendation to visit a garage for inspection or repair. A suitable measure is likewise conceivable to bring the vehicle to a standstill.

The fiber composite component may be set into the reference vibration by means of applying a reference pulse to a reference site of the fiber composite component.

It is of advantage if the reference pulse is essentially identical to the test pulse. As a consequence, it is possible to compare the response signal with the reference signal in a simpler manner.

It is of advantage if the reference site corresponds essentially to the test site. As a consequence, it is possible to compare the response signal with the reference signal.

A further aspect of the present disclosure is a device which is configured so as to perform all steps of the method in accordance with the present disclosure.

A further aspect of the present disclosure is a computer program which is configured so as to perform all the steps of the method in accordance with the present disclosure.

A further aspect of the present disclosure is a machine-readable storage medium on which the computer program in accordance with the present disclosure is stored.

BRIEF DESCRIPTION OF THE DRAWINGS

Preferred embodiments of the disclosure are explained below with the aid of the figures. In the drawings.

DETAILED DESCRIPTION

Figure 1:
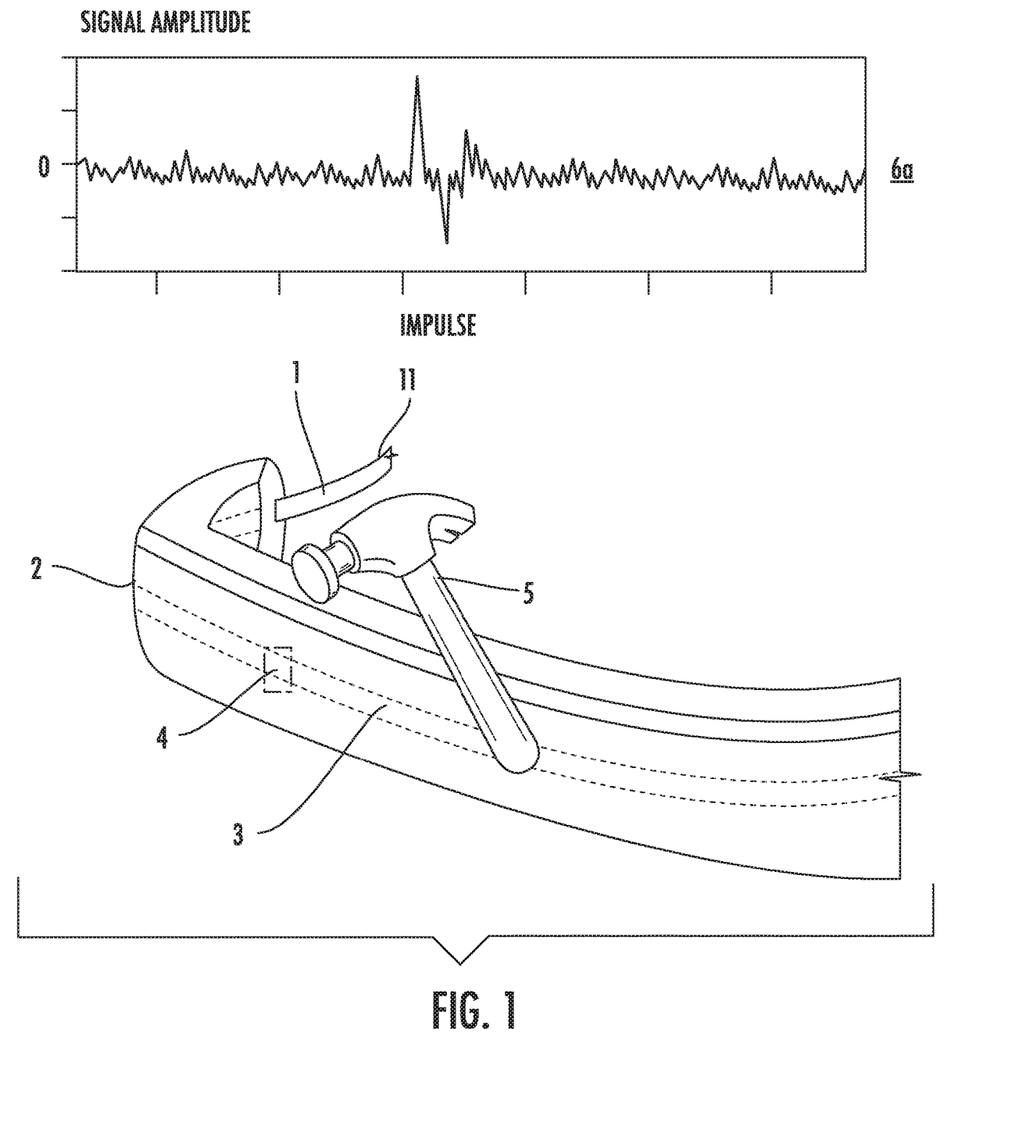
FIG. 1 illustrates a schematic view of a fiber composite component having a sensor device, which is integrated in the fiber composite component, during the generation of a reference signal.

FIG. 1 illustrates a schematic view of a fiber composite component 2 having a sensor device 3, which is integrated in the fiber composite component 2, during the generation of a reference signal 6a. The fiber composite component 2 is a bumper component for a vehicle. The fiber composite component 2 comprises a sensor device 1, which is integrated in the interior of the component 2 and comprises a flexible circuit carrier 3 and sensor modules 4 which are arranged on the circuit carrier 3.

The sensor device may be connected to the peripheral device via a connection means 11.

The term "a peripheral device" may be understood in this case to mean systems with which the sensor device 3 may be connected. When using the fiber composite component 2 in a vehicle by way of example as a body component, such a system may be a vehicle communication system, such as by way of example a CAN, FlexRay or a PSI5 communication system. It would be conceivable to provide a direct connection between the sensor device and a vehicle control unit, such as by way of example a control unit for controlling the driving dynamics or for initiating safety measures.

In this case, a possible connection means 11 is an accessible portion of the flexible circuit carrier 3. The accessible portion may be an exposed section or an exposed portion of the circuit carrier 3. A suitable interface for example one in the form of a plug-in interface is likewise conceivable. Moreover, a wireless interface for transmitting the captured sensor signals is conceivable. A wireless interface may be based on a radio technology or on a comparable wireless communication technology.

The reference signal 6a is obtained from the signal which is captured by the sensor device 1 which is integrated in the fiber composite component 2. In this case, it may be the directly captured signal or a signal which is derived from the directly captured signal. A typically derived signal may be obtained from a procedure of filtering (high pass/deep pass filtering) the directly captured signal.

In accordance with one embodiment, it is conceivable to apply only one reference pulse. Moreover, it is possible to generate the reference signal 6a by means of repeatedly applying reference pulses. The pulses may be of different strengths. The repeated application may be performed in regular intervals.

The figure illustrates the moment a reference pulse is applied to the fiber composite component 2. Said reference pulse is applied by means of a pulse application means 5 which is schematically illustrated in the form of a hammer 5. Said reference pulse may be applied by way of example at the end of the production process or procedure, or during the installation of the fiber composite component 2 and thus in the new state of the fiber composite component 2.

Figure 2:
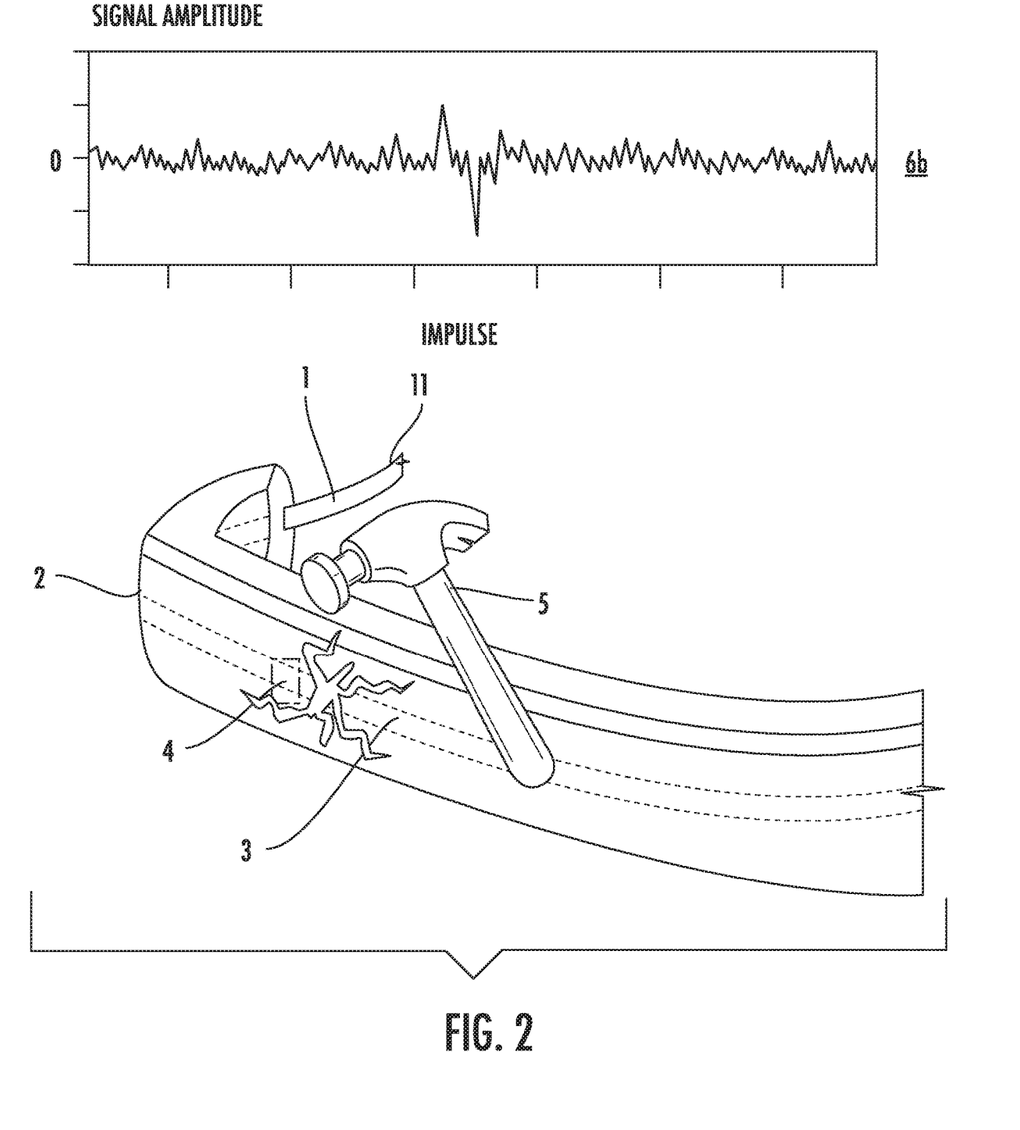
FIG. 2 illustrates a schematic view of a fiber composite component having a sensor device, which is integrated in the fiber composite component, during a testing procedure of the fiber composite component in accordance with of the present disclosure.

FIG. 2 illustrates a schematic view of a fiber composite component 2 having a sensor device 1, which is integrated in the fiber composite component 2, during a testing procedure of the fiber composite component 2 in accordance with the present disclosure. The fiber composite component 2 is a bumper component for a vehicle. The fiber composite component 2 comprises a sensor device 1 which is integrated in the interior of the component 2 and comprises a flexible circuit carrier 3 and sensor modules 4 which are arranged on the circuit carrier 3.

The figure illustrates damage on the fiber composite component 2. The illustrated damage is obvious. Depending upon the cause of the damage, it is also possible for the damage to a fiber composite component 2 not to be obvious. This occurs in particular in the case of comparatively slight damage. It is then possible that the damage does not leave any obvious external signs but there is still internal damage of the fiber composite component 2, such as by way of example delaminations, fiber breakage torn fibers, or fiber pull-outs, which have a disadvantageous effect on the characteristics of the component.

The figure illustrates the moment a test pulse is applied to the fiber composite component 2. Said test pulse is applied by means of a pulse application means 5 which is illustrated schematically in the form of a hammer 5.

The application of a test pulse produces a response signal 6b which may be compared with the reference signal 6a. It is possible via the comparison to establish a change in the characteristics of the component. If the change in the characteristics of the component indicates that the change has exceeded a threshold with regard to safety, then corresponding counter measures may be introduced. Such counter measures may range from the persistent storage of this information up to bringing to a standstill the vehicle in which the fiber composite component 2 is installed.

The test pulse may be applied depending upon the situation, by way of example after a collision within the scope of testing for collision damage. It is likewise conceivable to perform periodic testing in accordance with a test cycle. In such a case, it is also possible to establish any damage which has occurred either unnoticed or has occurred during the course of the lifetime of the fiber composite component 2 as a result of environmental influences which act on the fiber composite component 2.

Figure 3:
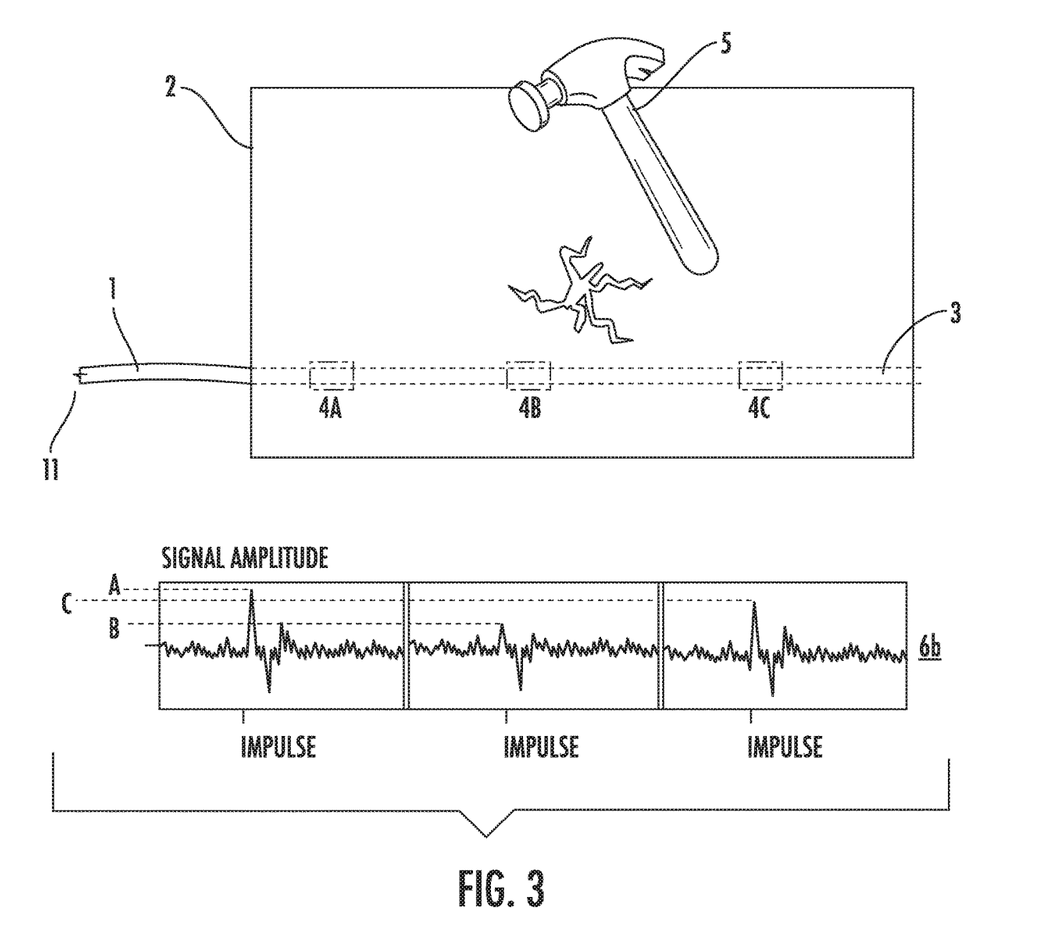
FIG. 3 illustrates a schematic view of a further fiber composite component having a sensor device, which is integrated in the fiber composite component, during a testing procedure of the fiber composite component in accordance with the present disclosure.

FIG. 3 illustrates a schematic view of a further fiber composite component 2 having a sensor device 1, which is integrated in the fiber composite component 2, during a testing procedure of the fiber composite component 2 in accordance with the present disclosure. In the illustrated fiber composite component 2, the integrated sensor device 1 spans the fiber composite component 2. The sensor modules 4a, 4b, 4c are likewise arranged in a distributed manner over the fiber composite component 2 using the flexible circuit carrier 3. In the illustrated embodiment, said sensor modules are distributed equi-distance from one another. It is likewise conceivable that the sensor modules 4a, 4b, 4c are arranged distributed in an irregular manner over the fiber composite component 2.

In the illustrated embodiment, the fiber composite component 2 is tested by means of applying test pulses to one or more test sites. Accordingly, the sensor modules 4a, 4b, 4c capture different response signals 6b. It is conceivable that the reference signal 6a is likewise generated by means of applying reference pulses to the corresponding reference sites. The test sites may in this case correspond essentially to the reference sites.

Figure 4:
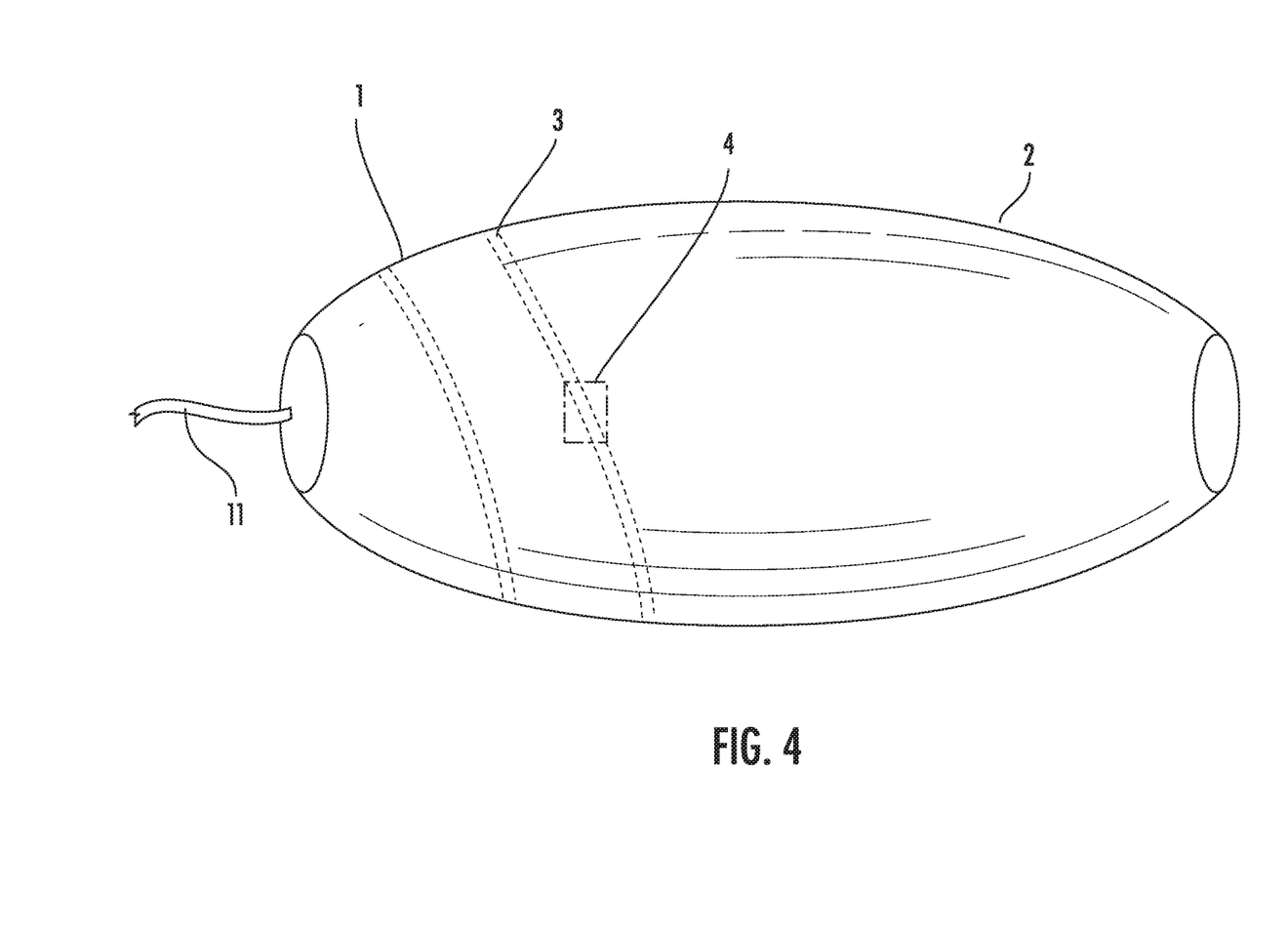
FIG. 4 illustrates a schematic view of a further fiber composite component having a sensor device, which is integrated in the fiber composite component and is suitable for testing the fiber composite component in accordance with the present disclosure.

FIG. 4 illustrates a schematic view of a further fiber composite component 2 having a sensor device 1, which is integrated in the fiber composite component 2 and is suitable for testing the fiber composite component 2 in accordance with the present disclosure. The fiber composite component 2 is a fiber composite tank. The fiber composite component 2 comprises a sensor device 1, which is integrated in the interior of the component 2 and comprises a flexible circuit carrier 3 and sensor modules 4 which are arranged on the circuit carrier 3.

The advantage of fiber composite components 2 which may be implemented simply into almost any geometric shapes are clearly visible in the illustrated embodiment. The use of flexible circuit carriers 3 or rather in the form of conductor foils and micromechanical sensor modules 4 which are attached thereto do not in this case significantly limit the design of fiber composite components 2. As a consequence, it is possible to provide almost any form of fiber composite component 2 with a corresponding sensor device 1 and consequently to suitably design it for the method of the present disclosure.

Figure 5:
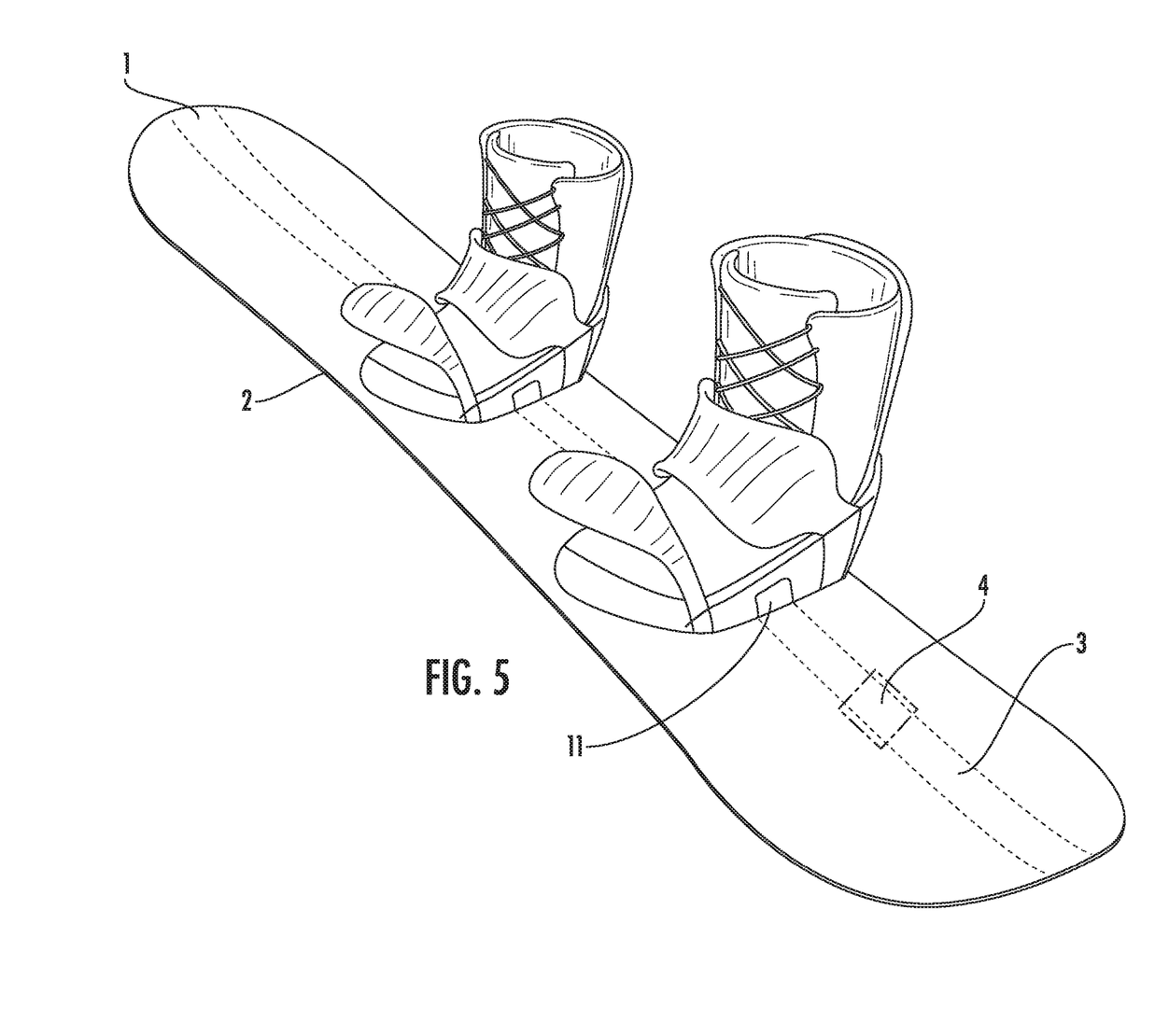
FIG. 5 illustrates a schematic view of a further fiber composite component having a sensor device, which is integrated in the fiber composite component and is suitable for testing the fiber composite component in accordance with the present disclosure.

FIG. 5 illustrates a schematic view of a further fiber composite component 2 having a sensor device 1, which is integrated in the fiber composite component 2 and is suitable for testing the fiber composite component 2 in accordance with the present disclosure. The fiber composite component 2 may be a sports appliance. The sports appliance is illustrated schematically as a snowboard. The fiber composite component 2 comprises a sensor device 1, which is integrated in the interior of the component 2 and comprises a flexible circuit carrier 3 and sensor modules 4 which are arranged on the circuit carrier 3. Moreover, the figure illustrates an evaluating unit 11. Said evaluating unit may be located—as illustrated—by way of example on the binding for a snowboard shoe.

Figure 6:
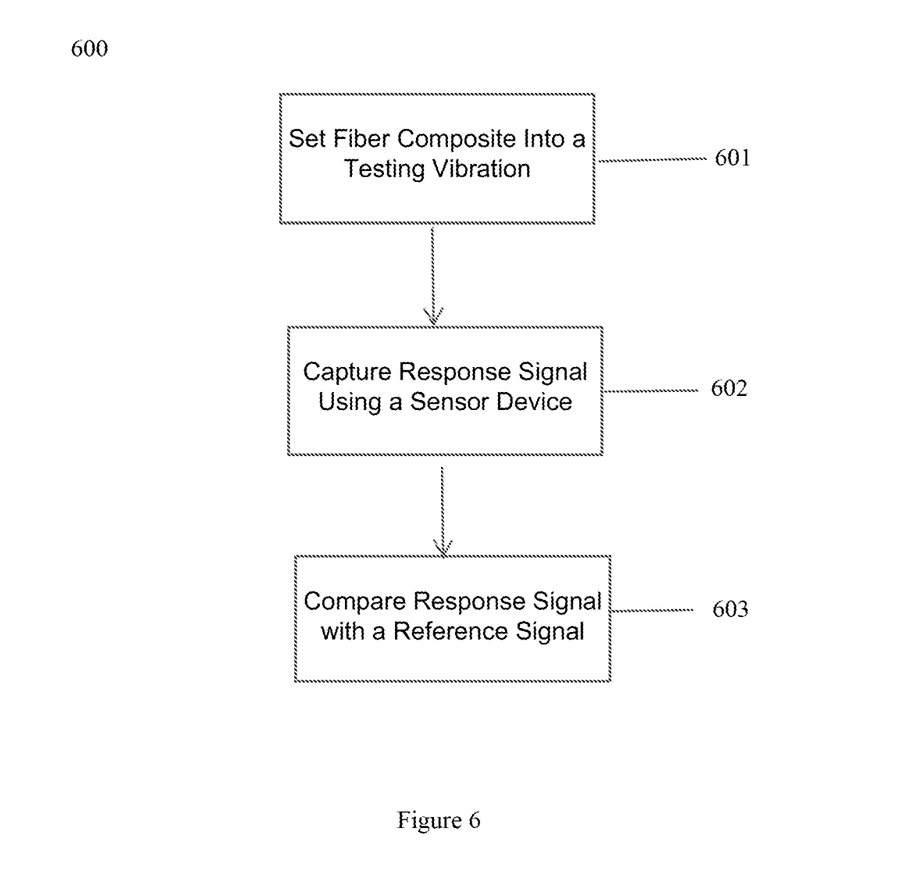
FIG. 6 illustrates a flow diagram of one embodiment of a method in accordance with the present disclosure.

FIG. 6 illustrates a flow diagram of an embodiment of a method 600 in accordance with the present disclosure.

In step 601, the fiber composite component 2 is set into a testing vibration. The testing vibration may be produced by means of applying a test pulse. It is possible for this purpose to use a suitable vibration generating means 5. Such a means may be by way of example a vibration device into which the fiber composite component 2 is clamped. The vibration generating means may be configured in such a manner that the test pulse is introduced at a defined test site of the fiber composite component 2.

In step 602, a response signal is captured using the sensor device. It is possible by means of a connection means of the sensor device to pass the response signal on to a further-processing device by way of example a testing device or a test control unit. A possible connection means is in this case an accessible portion or an accessible section of the flexible circuit carrier 3. The accessible portion or section may be an exposed portion or section of the circuit carrier. A suitable interface by way of example in the form of a plug-in interface is likewise conceivable. Moreover, a wireless interface for transmitting the captured sensor signals is conceivable. A wireless interface may be based in this case on a radio technology or a comparable wireless communication technology.

In step 603, the response signal 6b is compared with a reference signal 6a. It is generally possible to use any conceivable comparison method for comparing the two signals 6a, 6b. The aim of the comparison procedure is to identify whether and if yes to what extent the test signal 6b has changed with respect to the reference signal 6a. It is conceivable to define a threshold value for the changes, which if exceeded, is an indication that a change has occurred which renders it possible to conclude that the characteristics of the component with regard to safety have changed. If such a change occurs, a corresponding counter measure may be initiated. Such a counter measure may range from the persistent storage of this information up to bringing to a standstill the vehicle in which the fiber composite component 2 is installed.

What is claimed is:

1. A method for testing a fiber composite component, the fiber composite component including a sensor device integrated therein, the sensor device including a flexible circuit carrier having a sensor module that is a micromechanical sensor (MEMS) module configured to ascertain an acceleration value, the method comprising:
   setting the fiber composite component into a test vibration by external application of a test pulse to a test site of the fiber composite component;
   capturing an acceleration response signal using the sensor device; and
   comparing the response signal with a reference signal, wherein the reference signal is obtained by;
      setting, in a new state of the fiber composite component, the fiber composite component into a reference vibration by applying a reference pulse to a reference site of the fiber composite component and
      capturing the reference signal representing a reference vibration value of the reference vibration using the sensor device, the reference signal being one of (i) the captured reference signal and (ii) a signal derived from the captured reference signal,
      wherein the reference site corresponds essentially to the test site.

2. The method according to claim 1, wherein the reference pulse is essentially identical to the test pulse.

* * * * *